(12) United States Patent
Berdichevsky

(10) Patent No.: US 7,854,432 B2
(45) Date of Patent: Dec. 21, 2010

(54) DYNAMIC SEAL

(75) Inventor: Alexander Berdichevsky, Farmington Hills, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 11/065,023

(22) Filed: Feb. 24, 2005

(65) Prior Publication Data
US 2006/0186603 A1 Aug. 24, 2006

(51) Int. Cl.
*F16J 15/32* (2006.01)
(52) U.S. Cl. .................. 277/553; 277/559; 277/560; 277/561; 277/570
(58) Field of Classification Search .............. 277/553, 277/559–562, 570, 569
See application file for complete search history.

(56) References Cited

U.S. PATENT DOCUMENTS

| | | | |
|---|---|---|---|
| 2,482,029 A * | 9/1949 | Reynolds | 277/504 |
| 2,635,907 A | 4/1953 | Heimbuch | |
| 2,697,623 A | 12/1954 | Mosher | |
| 2,731,284 A | 1/1956 | Chambers, Jr. et al. | |
| 2,736,583 A | 2/1956 | Marvin | |
| 2,736,585 A | 2/1956 | Riesing | |
| 2,736,586 A | 2/1956 | Riesing | |
| 2,743,950 A | 5/1956 | Helfrecht et al. | |
| 2,797,944 A | 7/1957 | Riesing | |
| 3,005,648 A * | 10/1961 | Christensen | 277/560 |
| 3,049,356 A | 8/1962 | Talamonti | |
| 3,356,376 A | 12/1967 | Bradfute et al. | |
| 3,554,566 A * | 1/1971 | Bechtrold et al. | 277/561 |
| 3,572,734 A | 3/1971 | Holt | |
| 3,612,546 A | 10/1971 | Otto et al. | |
| 3,623,738 A * | 11/1971 | MacDonnell | 277/356 |
| 3,785,660 A | 1/1974 | Bush | |
| 3,822,890 A | 7/1974 | Bourgeois | |
| 3,827,703 A * | 8/1974 | Brink | 277/553 |
| 3,921,987 A | 11/1975 | Johnston | |
| 3,921,990 A | 11/1975 | Johnston | |
| 3,941,396 A | 3/1976 | Bailey et al. | |
| 4,021,049 A | 5/1977 | Phelps et al. | |
| 4,037,849 A | 7/1977 | Thumm | |
| 4,106,781 A | 8/1978 | Benjamin et al. | |

(Continued)

FOREIGN PATENT DOCUMENTS

DE 20111007 U1 3/2002

(Continued)

*Primary Examiner*—Alison K Pickard
(74) *Attorney, Agent, or Firm*—Ronald W. Wangerow; Harness, Dickey & Pierce, P.L.C.

(57) ABSTRACT

A dynamic shaft seal assembly is provided including a dynamic seal for engaging a rotary shaft. The dynamic seal includes a base portion that is mounted within a casing and has an axially extending barrel portion extending from a radially inner end of the base portion. The axially extending barrel portion terminates in a radially extending leg portion which extends inwardly from an end of the axially extending portion. A generally conically shaped seal portion extends from an end of the radially extending portion and the seal portion includes a radially inner face engaging the shaft and a radially outer face having a stiffening bead integrally formed thereon. The stiffening bead reduces the seal's propensity for "bell mouthing" while the axially extending barrel portion provides improved shaft followability for the dynamic seal.

45 Claims, 3 Drawing Sheets

U.S. PATENT DOCUMENTS

| | | | |
|---|---|---|---|
| 4,190,258 A * | 2/1980 | Arai et al. .................... 277/554 |
| 4,208,060 A | 6/1980 | St. Laurent, Jr. |
| 4,226,428 A | 10/1980 | Paptzun |
| 4,229,010 A | 10/1980 | St. Laurent, Jr. |
| 4,270,762 A | 6/1981 | Johnston |
| 4,274,641 A | 6/1981 | Cather, Jr. |
| 4,344,631 A | 8/1982 | Winn |
| 4,348,031 A | 9/1982 | Johnston |
| 4,360,208 A * | 11/1982 | Hill et al. .................... 277/504 |
| 4,413,829 A | 11/1983 | Pietsch |
| 4,449,717 A | 5/1984 | Kitawaki et al. |
| 4,474,484 A | 10/1984 | Macinnes et al. |
| 4,519,616 A | 5/1985 | Johnston |
| 4,553,763 A | 11/1985 | Ehrmann |
| 4,585,236 A | 4/1986 | Simmons et al. |
| 4,588,195 A | 5/1986 | Antonini et al. |
| 4,611,931 A | 9/1986 | Brandenstein et al. |
| 4,630,834 A | 12/1986 | Muller et al. |
| 4,635,947 A | 1/1987 | Hatayama |
| 4,650,196 A * | 3/1987 | Bucher et al. ............... 277/553 |
| 4,750,748 A | 6/1988 | Visser |
| 4,805,919 A | 2/1989 | Wiblyi et al. |
| 4,815,749 A * | 3/1989 | Johnston .................... 277/559 |
| 4,844,484 A | 7/1989 | Antonini et al. |
| 4,986,553 A | 1/1991 | Preston et al. |
| 4,995,621 A | 2/1991 | Devouassoux et al. |
| 5,004,248 A | 4/1991 | Messenger et al. |
| 5,137,285 A | 8/1992 | Pick |
| 5,190,299 A | 3/1993 | Johnston |
| 5,244,215 A | 9/1993 | Cather, Jr. et al. |
| 5,292,199 A | 3/1994 | Hosbach et al. |
| 5,348,312 A | 9/1994 | Johnston |
| 5,348,313 A * | 9/1994 | Pawlakowitsch ............ 277/409 |
| 5,370,404 A | 12/1994 | Klein et al. |
| 5,398,942 A | 3/1995 | Duckwall et al. |
| 5,427,387 A | 6/1995 | Johnston |
| 5,462,287 A | 10/1995 | Hering et al. |
| 5,462,288 A | 10/1995 | Hering et al. |
| 5,476,270 A | 12/1995 | vom Schwemm et al. |
| 5,501,469 A | 3/1996 | Ducugnon et al. |
| 5,509,667 A | 4/1996 | Klein et al. |
| 5,624,290 A | 4/1997 | Von Bergen et al. |
| 5,711,534 A | 1/1998 | Bengoa et al. |
| 5,791,658 A | 8/1998 | Johnston |
| 5,842,828 A | 12/1998 | Ozawa et al. |
| 5,921,555 A | 7/1999 | Johnston |
| 5,957,461 A | 9/1999 | Ulrich |
| 5,967,527 A * | 10/1999 | Fabro et al. .................. 277/560 |
| 6,279,914 B1 * | 8/2001 | Yamanaka et al. .......... 277/569 |
| 6,298,955 B1 | 10/2001 | Frost |
| 6,357,757 B1 * | 3/2002 | Hibbler et al. ............... 277/551 |
| 6,409,177 B1 | 6/2002 | Johnston |
| 6,428,013 B1 | 8/2002 | Johnston et al. |
| 6,481,896 B1 | 11/2002 | Ohtsuki et al. |
| 6,513,812 B1 | 2/2003 | Yang et al. |
| 6,520,507 B2 | 2/2003 | Pataille et al. |
| 6,601,855 B1 | 8/2003 | Clark |
| 6,688,603 B2 | 2/2004 | von Schemm |
| 6,702,293 B2 | 3/2004 | Endo et al. |
| 6,860,486 B2 | 3/2005 | Hacker et al. |
| 6,921,080 B2 | 7/2005 | Johnen |
| 6,945,537 B2 * | 9/2005 | Guillerme et al. ........... 277/559 |
| 7,004,471 B2 | 2/2006 | Bryde et al. |
| 7,134,669 B2 | 11/2006 | Uhrner |
| 7,344,140 B2 * | 3/2008 | Ikeda .......................... 277/572 |
| 2002/0117810 A1 | 8/2002 | vom Schemm |
| 2003/0006563 A1 | 1/2003 | Cater et al. |
| 2003/0085527 A1 | 5/2003 | Hacker et al. |
| 2003/0189293 A1 | 10/2003 | Johnen |
| 2003/0230850 A1 | 12/2003 | Bruyere et al. |
| 2003/0230852 A1 | 12/2003 | Bengoa et al. |
| 2003/0230855 A1 * | 12/2003 | Malone et al. ............... 277/554 |
| 2004/0160014 A1 | 8/2004 | Uhrner |
| 2005/0098959 A1 | 5/2005 | Uhrner |
| 2005/0104302 A1 * | 5/2005 | Matsui et al. ................ 277/562 |
| 2005/0140097 A1 * | 6/2005 | Kosty et al. .................. 277/627 |
| 2005/0167928 A1 * | 8/2005 | Park et al. .................... 277/560 |
| 2006/0022414 A1 | 2/2006 | Balsells |
| 2006/0033291 A1 * | 2/2006 | Tones et al. ................. 277/562 |
| 2006/0125192 A1 * | 6/2006 | Johnston ...................... 277/559 |

FOREIGN PATENT DOCUMENTS

| | | |
|---|---|---|
| DE | 20121487 U1 | 1/2003 |
| DE | 10353305 | 5/2004 |
| DE | 10353304 A1 | 6/2005 |

* cited by examiner

DYNAMIC SEAL

FIELD OF THE INVENTION

The present invention relates to dynamic shaft seals, and more particularly, to a dynamic shaft seal design to reduce the seal's torque, propensity for bell mouthing, and for providing improved shaft followability.

BACKGROUND AND SUMMARY OF THE INVENTION

Rotary shaft seals have been utilized in machinery, the automobile industry, as well as other industries. Three major problems associated with seals designed to have substantial contact areas between the shaft and the lip of the seal are "bell mouth," the shaft followability at low temperatures, and oil carbonization in the pumping grooves due to local temperature rise cause increased torque. "Bell mouth" is a phenomenon associated with the lift of the edge of the lip from the shaft. The problem is extenuated for highly incompressible materials, like rubber. The ability of the seal to follow the shaft when the shaft either wobbles or is misaligned, is also important to a seal design.

The present invention is designed to reduce seal torque, the propensity for "bell mouthing" and also provides for improved shaft followability at low temperatures. The dynamic seal includes an annular mounting portion which is capable of being mounted to a casing which surrounds a rotary shaft. The seal includes an axially extending portion extending from the radially inner end of the mounting portion, with a radially extending portion extending inwardly from an end of the axially extending portion. A generally conically shaped seal portion extends from an end of the radially extending portion with the seal portion including a radially inner face provided with a plurality of grooves and a radially outer face having a special bead defining a region of increased thickness. The bead acts as an integral spring for counteracting the "bell mouthing" propensity of the seal portion as well as a means to control the gap between the essentially conical portion of the seal and the shaft. The bead can have different shapes including a triangular-cross section or a rounded bead, as well as other configurations which are deemed to be appropriate. The bead is positioned slightly away from the edge of the lip to allow a proper contact area to develop, which would normally be between the edge of the seal and the bead. The flexibility of the axially extending portion of the seal provides an improvement in the shaft followability due to the generally cylindrical shape of the axially extending portion having lower bending stiffness. Therefore, if the material of the seal does not have sufficient intrinsic elasticity, making the axially extending portion of the seal in a generally cylindrical shape improves the overall shaft followability. The length and the wall thickness of the cylindrical portion allow one to control the degree of flexibility to match the application requirements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
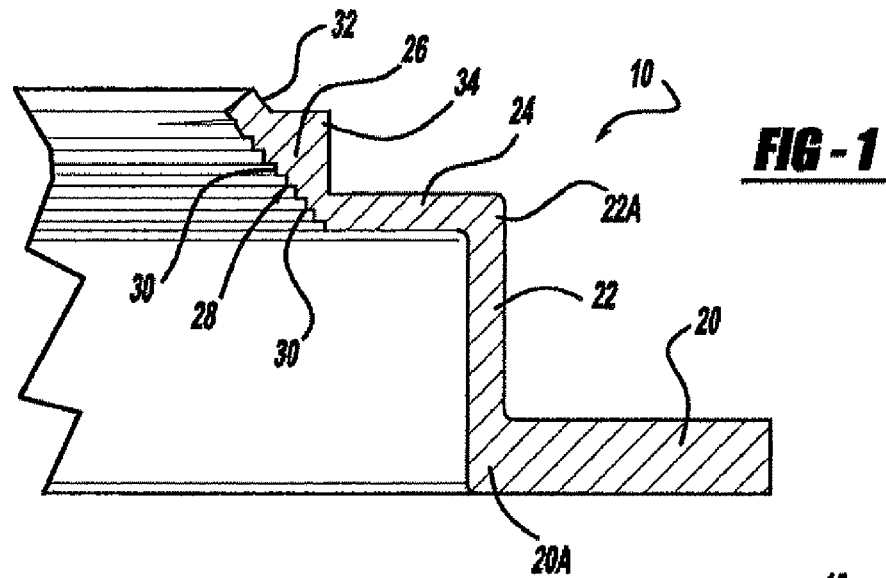
FIG. 1 is a detailed cross-sectional view of the dynamic seal according to the principles of the present invention.
Figure 2:
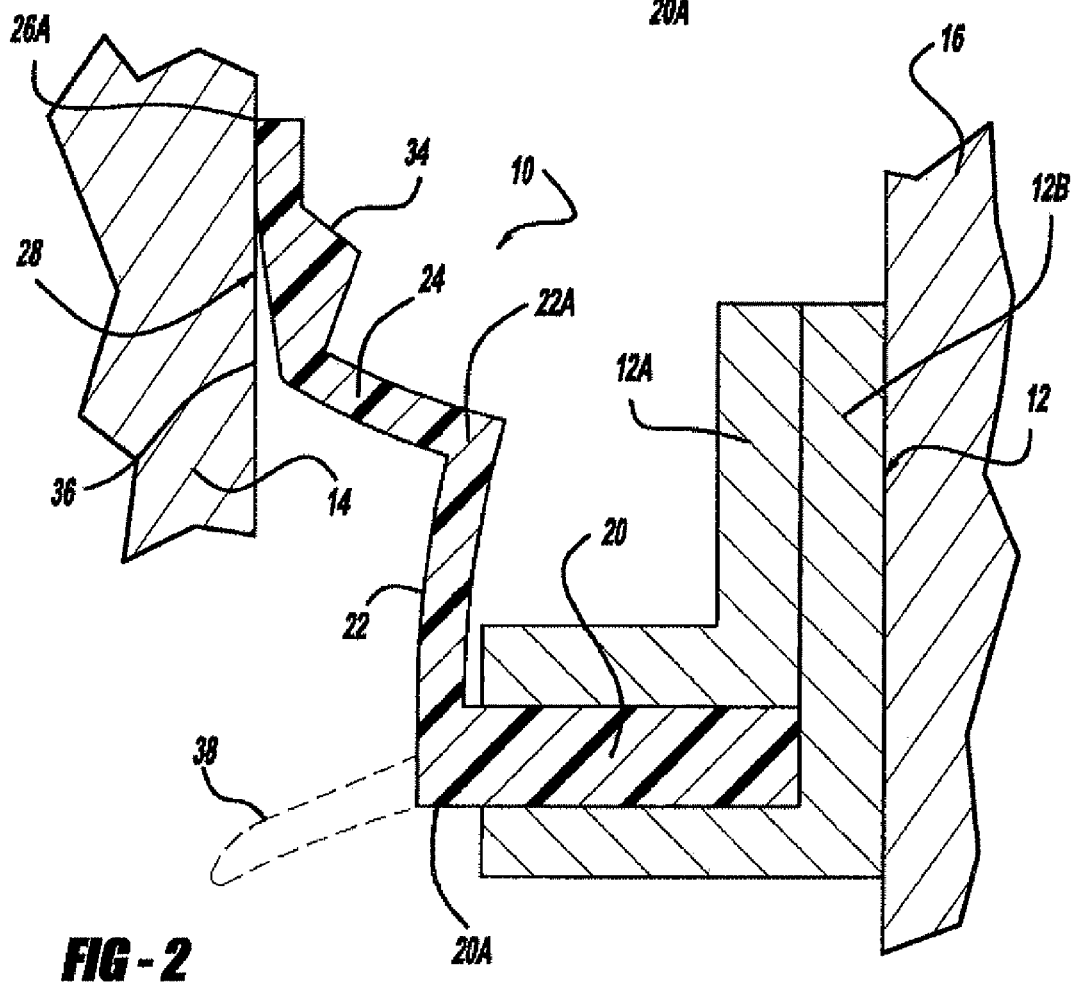
FIG. 2 is a cross-sectional view of the dynamic seal disposed against a shaft according to the principles of the present invention.
Figure 3:
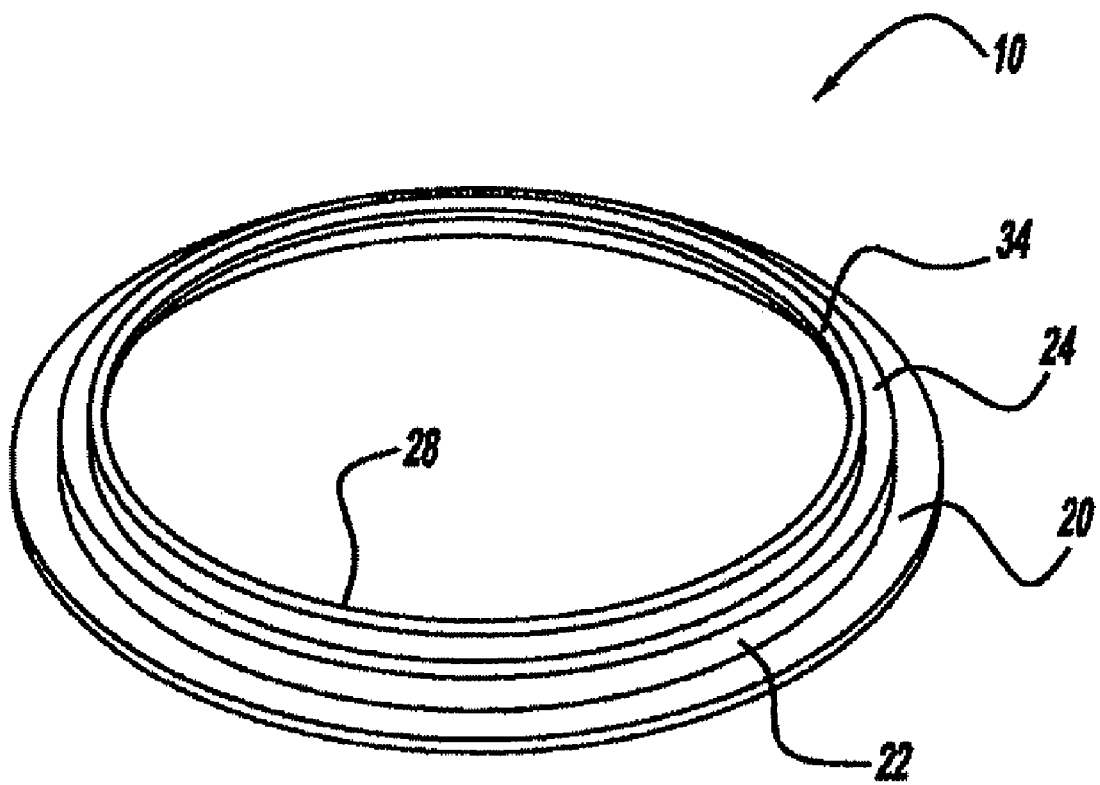
FIG. 3 is a perspective view of the dynamic seal according to the principles of the present invention.

With reference to FIGS. 1-3, the dynamic seal 10, according to the principles of the present invention, will now be described. The dynamic seal 10 is mounted to a casing 12 which is disposed in a fixed housing 16 (best shown in FIG. 2) in a manner which is well known in the art. The dynamic seal 10 engages a rotary shaft 14 so that the dynamic seal 10 provides a sealed relationship between the rotary shaft 14 and the housing 16 in which the casing 12 is disposed. With reference to FIG. 1, the dynamic seal 10 includes a mounting portion/leg 20 which is designed to be engaged between first and second portions 12A, 12B of casing 12. It should be noted that the mounting portion/leg 20 can take on many shapes and forms and is not considered to be particularly relevant to the present invention. The mounting portion/leg 20 is mounted to the casing 12 which can be made of plastic or metal and the mounting portion/leg 20 can be clamped or bonded thereto according to well known mounting techniques.

The dynamic seal 10 includes an axially extending barrel portion/leg 22 extending from a radially inner end 20A of the mounting portion/leg 20. The axially extending barrel portion/leg 22 is preferably generally cylindrical in shape although other shapes, such as conical or a convoluted curve shape, can also be utilized. The dynamic seal 10 includes a radially extending portion/leg 24 extending inwardly from a distal end 22B of the axially extending barrel portion/leg 22. A generally conically shaped seal portion/leg 26 extends from a radially innermost end 24A of the radially extending portion/leg 24. The seal portion/leg 26 includes a radially inner face 28 which may be provided with a plurality of grooves 30. The grooves 30 can be helical in shape or can take other known forms. The grooves 30 provided in the radially inner surface 28 of the seal portion/leg 26 are capable of retaining oil therein in order to provide lubrication between the dynamic shaft seal 10 and rotary shaft 14 and also can provide a pumping function for returning leaked oil to the oil side of the seal. A radially outer face 32 of the conically shaped seal portion/leg 26 is provided with a stiffening bead 34 defining a region of increased thickness. The stiffening bead 34 can have different shapes, including a triangular shape, as shown, or can have rounded or other shape configurations. The stiffening bead 34 is positioned slightly away from the end edge 26A of the lip 26 to allow a proper contact area to develop. The bead 34 serves as an integrally formed spring for biasing the seal portion/leg 26 against the rotary shaft 14 for counteracting bell mouthing of the seal portion/leg 26. Normally, the seal lip-free edge faces the oil side. However, reverse mounting is also possible. In that case, the design of the spiral grooves have to be accommodated approximately to pump in the direction of the oil sump.

The improvement in the shaft followability of the dynamic seal 10 is provided by the axially extending barrel portion/leg 22. The generally cylindrical shape of the barrel portion/leg 22 has a lower bending stiffness than other structures; therefore, the axially extending barrel portion/leg 22 is able to readily account for a wobbling shaft or a shaft that is out of center relative to the housing 16.

It should be noted that if desired or advantageous in a particular application, the dynamic shaft seal 10 of the present invention can optionally include one or more axial or radial dirt protective lips 38 as are known in the art, one of which is shown, for example, in FIG. 2. The optional dirt protective lip 38 can be formed integrally with the dynamic shaft seal, or can be formed separately therefrom and attached thereto, and can have any of a number of shapes or configurations, as is also known in the art. In addition, the lip 38 can protrude transversely from the dynamic shaft seal in any of a number of directions, including, but not limited to, the exemplary angular relationship protruding generally radially away and axially away from the shaft-engaging sealing components, as shown, for example, in FIG. 2.

The radially extending portion/leg 24 can be straight, as shown, or alternatively, can be provided with a convoluted shape. The outer diameter of the shaft is specifically designed to have a larger diameter than the inner diameter of the radially inwardly extending portion/leg 24. As illustrated in FIG. 2, the generally conically shaped seal portion/leg 26 is designed to take on a generally cylindrical form when deformed by the rotary shaft 14 and the leg 24 is designed to apply pressure to the heel portion 36 of the seal portion/leg 26. The radially extending portion/leg 24 acts radially on the end 22A of the barrel portion/leg 22 which has a length sufficient to allow the barrel portion/leg 22 to flex radially inwardly and outwardly to accommodate for shaft wobble or shaft misalignment. The length of the radially extending portion/leg 24 is derivative from the length of the seal portion/leg 26, the amount of the seal-to-shaft interference, and the distance between the casing and the shaft.

Figure 4:
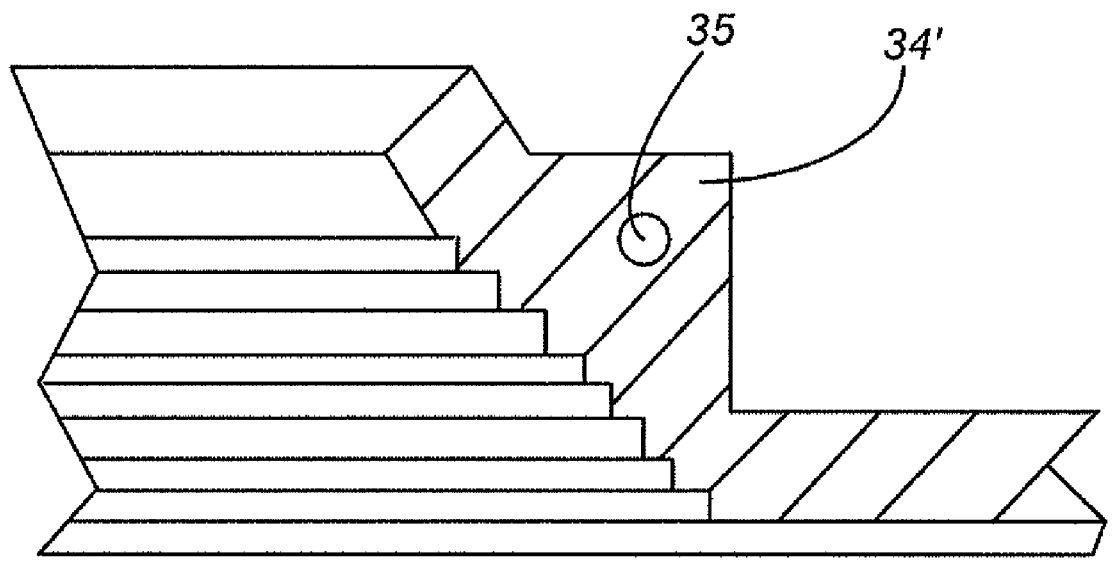
FIG. 4 is a fragmentary cross-sectional view of an alternate dynamic seal.

The dynamic shaft seal 10 of the present invention can be utilized for isolating an oil environment from an air environment disposed on either side of the dynamic seal 10. In order to optimize the seal design, the length of the seal portion/leg 26 and the stiffness of the bead 34 (geometry, thickness, material, etc.) are specifically chosen for particular applications. Furthermore, the thickness of the radially extending portion/leg 24 is also specifically designed to provide sufficient pressure on the heel 36 of the seal portion/leg 26. The thickness and length of the barrel portion/leg 22 should also be specifically designed to accommodate the requisite flexibility of a particular application. The seal material composition for the dynamic seal can include plastic, rubber, or any of a wide variety of known elastomers, such as PTFE, TPE (thermoplastic elastomers), TPV (thermoplastic vulcanizates), and Flouroprene™ material, a composition described in U.S. Pat. No. 6,806,306. As seen in FIG. 4, an additional embedded spring 35 in the bead 34' may be utilized in order to extend the life of the seal due to the fact that creep can occur in thermoplastic or elastomeric materials which prevents the material from regaining its original properties. The spring would then provide an additional radial load on the seal surface that the thermoplastic material is incapable of maintaining over a long life. The spring can also improve the robustness of the seal required in contaminated environments. Instead of imbedding, the spring can be placed in a specially designed and manufactured spring groove after completion of the molding operation (as is normal with other radial lip seals).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dynamic seal, comprising:
an annular mounting portion;
an axially extending leg extending from a radially inner end of said mounting portion;
a radially extending leg having a radially outer end and a radially inner end, said radially outer end adjacent said axially extending leg, said radially extending leg extending inwardly from an end of said axially extending leg; and
a seal leg extending only in a single axial direction from said radially inner end of said radially extending leg and having a proximal heel end attached at said radially inner end of said radially extending leg, said seal leg being generally conically shaped and including a radially inner face adapted to engage a rotary shaft and a radially outer face having a region of increased thickness, said radially extending leg adapted to bias said proximal heel end toward the rotary shaft, said region of increased thickness being spaced from a distal end of said seal leg and said heel end so as to provide a biasing force to cause an entirety of said seal leg extending from a location axially between said region of increased thickness and said distal end to said distal end to take on a cylindrical form when engaged with a shaft.

2. The dynamic seal according to claim 1, wherein said radially inner face of said seal leg is provided with a plurality of helical grooves.

3. The dynamic seal according to claim 1, wherein said seal is made from an elastomeric material.

4. The dynamic seal according to claim 1, wherein said seal is made from a plastic material.

5. The dynamic seal according to claim 1, further comprising a dirt lip extending from said mounting portion.

6. The dynamic seal according to claim 5, wherein said dirt lip is integrally formed with said mounting portion.

7. The dynamic seal according to claim 1, wherein the composition of said dynamic seal includes one of PTFE, thermoplastic elastomer, and thermoplastic vulcanizates.

8. A dynamic seal, comprising:
a base portion; and
a generally conically shaped seal leg having an axially outer end and an axially inner end connected to said base portion, said conically shaped seal leg including a conically shaped radially inner face adapted to engage a rotary shaft and a radially outer face having a bead region of increased thickness spaced axially inwardly relative to said axially outer end such that said bead region is a thickest portion of said generally conically shaped seal leg and said outer end is a thinnest portion of said generally conically shaped seal leg, and said bead region causing an entirety of said generally conically shaped seal leg disposed on the radially inner face and extending from a location axially between said bead region and said axially outer end to said axially outer end to have a cylindrical shape in contact with the shaft.

9. The dynamic seal according to claim 8, wherein said radially inner face of said seal leg is provided with a plurality of grooves.

10. The dynamic seal according to claim 8, wherein said bead region is spaced from an end edge of said radially outer face of said conically shaped seal leg.

11. The dynamic seal according to claim 8, wherein said seal is made from a plastic material.

12. The dynamic seal according to claim 8, further comprising a dirt lip extending from said base portion.

13. The dynamic seal according to claim 12, wherein said dirt lip is integrally formed with said base portion.

14. A dynamic shaft seal assembly, comprising:
a shaft;
an annular seal mounting portion;
an axially extending cylindrical barrel extending from a radially inner end of said mounting portion;
a radially extending leg extending inwardly from an end of said axially extending barrel;
a generally conically shaped seal leg having a first end attached to an end of said radially extending leg portion, a second end opposite said first end and a bead region located axially between said first and second ends, a first portion of said seal leg extending from a location axially between said bead region and said second end to said second end and having a lesser thickness than said bead region, said entire first portion including a radially inner face adapted to take on a generally cylindrical form when engaged with said shaft, said radially inner face including at least one helical groove therein, said at least one helical groove disposed axially between first and second axially spaced portions of said radially inner face which take on a generally cylindrical form to engage said shaft.

15. The dynamic seal according to claim 14, wherein said bead region includes a region of increased thickness in a radially outer face of said seal leg.

16. The dynamic seal according to claim 14, wherein said axially extending barrel portion is hingedly attached to said mounting portion.

17. The dynamic seal according to claim 14, wherein said seal leg is made from a plastic material.

18. The dynamic seal according to claim 14, further comprising a dirt lip extending from said mounting portion.

19. The dynamic seal according to claim 18, wherein said dirt lip is integrally formed with said mounting portion.

20. A dynamic seal, comprising:
an annular mounting portion;
an axially extending leg extending from said mounting portion;
a radially extending leg extending from said axially extending leg and including a radially inner portion having a first diameter;
a seal leg extending from said radially inner portion of said radially extending leg and including a radially inner conically shaped face and a radially outer face having a bead region of increased thickness, an entirety of said radially inner conically shaped face adapted to engage a portion of a rotary shaft and take on a cylindrical shape from a location axially between said bead region and a distal end of said seal leg to said distal end, said portion of the rotary shaft having a second diameter greater than the first diameter, said radially inner conically shaped face including a plurality of grooves therein, at least one of said grooves disposed axially between first and second portions of said radially inner conically shaped face which are configured to engage the rotary shaft; and
a dirt lip extending from said mounting portion.

21. The dynamic seal according to claim 20, wherein said axially extending barrel portion is hingedly attached to said mounting portion.

22. The dynamic seal according to claim 20, wherein said seal is made from a plastic material.

23. The dynamic seal according to claim 20, wherein said dirt lip is integrally formed with said mounting portion.

24. A dynamic shaft seal assembly, comprising:
a shaft;
an annular casing surrounding said shaft;
a seal having a base portion mounted to said casing, said seal including an axially extending leg extending from said base portion, a radially extending leg extending inwardly from an end of said axially extending leg, a generally conically shaped seal leg extending from an end of said radially extending leg, said radially extending leg having an inner diameter less than an outer diameter of said shaft and said seal leg including a radially inner face engaging said shaft and a radially outer face having a stiffening bead thereon and a spring member embedded in said stiffening bead.

25. The dynamic shaft seal assembly according to claim 24, wherein said radially inner face of said seal leg includes a plurality of grooves therein.

26. The dynamic shaft seal assembly according to claim 24, wherein said axially extending leg is generally cylindrical.

27. The dynamic shaft seal assembly according to claim 24, wherein said shaft has an outside diameter larger than an inner diameter of said end of said radially extending leg.

28. The dynamic shaft seal assembly according to claim 24, wherein said seal is made from an elastomeric material.

29. The dynamic shaft seal assembly according to claim 24, further comprising a dirt lip integrally formed with and extending from said base portion of said seal toward said shaft.

30. The dynamic seal assembly according to claim 29, wherein said dirt lip is integrally formed with said base portion.

31. A dynamic shaft seal assembly, comprising:
a shaft;
an annular casing surrounding said shaft;
a seal having an annular mounting portion, an axially extending generally cylindrical barrel portion extending from said mounting portion, a radially extending leg extending inwardly from an end of said axially extending barrel portion and a generally conically shaped seal leg extending from an end of said radially extending leg, said radially extending leg having an inner diameter less than an outer diameter of said shaft and said seal leg including a radially inner face adapted to engage a rotary shaft; and
a dirt lip extending from said mounting portion of said seal toward said shaft.

32. The dynamic shaft seal assembly according to claim 31, wherein said radially inner face of said seal leg includes a plurality of grooves therein.

33. The dynamic shaft seal assembly according to claim 31, wherein said seal leg includes a radially outer surface including a stiffening bead.

34. The dynamic shaft seal assembly according to claim 31, wherein said shaft has an outside diameter larger than an inner diameter of said end of said radially extending leg.

35. The dynamic shaft seal assembly according to claim 31, wherein said dirt lip is integrally formed with said mounting portion.

36. A dynamic shaft seal assembly, comprising:
a shaft having a first diameter;
an annular casing surrounding said shaft;
a seal having an annular mounting portion, an axially extending cylindrical barrel portion hingedly attached to said mounting portion, a radially extending leg extending from said axially extending leg and a seal leg mounted to said radially extending leg said radially extending leg including a radially inner portion having a second diameter less than the first diameter, said seal leg including a radially inner conically shaped face engaging said shaft, said radially inner conically shaped face including a plurality of grooves therein, at least one of said grooves disposed axially between first and second axially spaced portions of said radially inner face which are engaged with said rotary shaft; and a dirt lip extending from said mounting portion.

37. The dynamic shaft seal assembly according to claim 36, wherein said seal leg includes a radially outer surface including a stiffening bead.

38. The dynamic seal assembly according to claim 36, wherein said seal is made from a plastic material.

39. The dynamic seal assembly according to claim 36, wherein said dirt lip is integrally formed with said mounting portion.

40. A dynamic shaft seal assembly, comprising:

a shaft;

an annular casing surrounding said shaft;

a seal having a base portion mounted to said casing, said seal including an axially extending leg extending from said base portion, a radially extending leg extending inwardly from an end of said axially extending leg, a generally conically shaped seal leg extending from an end of said radially extending leg, said radially extending leg having an inner diameter less than an outer diameter of said shaft and said seal leg including a radially inner face engaging said shaft and a radially outer face having a stiffening bead thereon; and a dirt lip integrally formed with and extending from said base portion of said seal toward said shaft.

41. The dynamic shaft seal assembly according to claim 40, wherein said radially inner face of said seal leg includes a plurality of grooves therein.

42. The dynamic shaft seal assembly according to claim 40, wherein said axially extending leg is generally cylindrical.

43. The dynamic shaft seal assembly according to claim 40, wherein said shaft has an outside diameter larger than an inner diameter of said end of said radially extending leg.

44. The dynamic shaft seal assembly according to claim 40, wherein said seal is made from an elastomeric material.

45. The dynamic seal assembly according to claim 40, wherein said dirt lip is integrally formed with said base portion.

* * * * *